(12) United States Patent
Razaznejad et al.

(10) Patent No.: US 8,880,311 B2
(45) Date of Patent: Nov. 4, 2014

(54) METHOD AND DEVICE FOR CONTROLLING DISENGAGEMENT OF AN AUTOMATED VEHICLE MASTER CLUTCH

(75) Inventors: Behrooz Razaznejad, Göteborg (SE); Henrik Ryberg, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 277 days.

(21) Appl. No.: 13/140,466

(22) PCT Filed: Dec. 19, 2008

(86) PCT No.: PCT/SE2008/000732
§ 371 (c)(1),
(2), (4) Date: Aug. 10, 2011

(87) PCT Pub. No.: WO2010/071495
PCT Pub. Date: Jun. 24, 2010

(65) Prior Publication Data
US 2011/0307153 A1 Dec. 15, 2011

(51) Int. Cl.
*B60W 10/02* (2006.01)
*B60W 30/20* (2006.01)
*B60W 10/06* (2006.01)
*B60W 10/08* (2006.01)
*B60W 10/11* (2012.01)
*B60W 30/19* (2012.01)
*F16H 59/14* (2006.01)

(52) U.S. Cl.
CPC ............... *B60W 10/02* (2013.01); *B60W 10/06* (2013.01); *B60W 10/08* (2013.01); *B60W 10/11* (2013.01); *B60W 30/19* (2013.01); *B60W 2510/0657* (2013.01); *F16D 2500/50684* (2013.01); *F16D 2500/70424* (2013.01); *F16H 2059/144* (2013.01)
USPC ........................................... 701/67; 477/174

(58) Field of Classification Search
None
See application file for complete search history.

(56) References Cited

U.S. PATENT DOCUMENTS 3,543,891 A * 12/1970 Mathers .......................... 477/92
6,847,878 B2 1/2005 Cimmino et al.
(Continued)

FOREIGN PATENT DOCUMENTS

DE 19916655 A1 11/2000
EP 1439087 A2 7/2004
(Continued)

OTHER PUBLICATIONS

Interrgational Search Report for corresponding International Application PCT/SE2008/000732.
(Continued)

*Primary Examiner* — Musssa A Shaawat
(74) *Attorney, Agent, or Firm* — WRB-IP LLP

(57) ABSTRACT

A method and device are provided for controlling disengagement of an automated vehicle master clutch arranged in a vehicle drivetrain between a vehicle propulsion unit and a step geared transmission. The method includes the steps of determining a first output torque of the propulsion unit prior to initiation of a master clutch disengagement procedure, computing a second output torque of the propulsion unit in dependence of at least the first output torque, and where the second output torque is closer to zero torque than the first output torque, initiating the master clutch disengagement procedure by initiating an oscillation in drive shafts by abruptly altering propulsion unit output torque from the first to the second output torque, and disengaging the master clutch when the oscillation has reached a first oscillation turning point. Benefits can include faster gear shifting and better comfort with maintained transmission durability.

8 Claims, 3 Drawing Sheets

(56) References Cited

U.S. PATENT DOCUMENTS

| | | | |
|---|---|---|---|
| 7,311,629 B2* | 12/2007 | Vornehm et al. | 475/210 |
| 8,387,767 B2* | 3/2013 | Komorowski et al. | 192/90 |
| 2004/0029679 A1 | 2/2004 | Dreibholz et al. | |
| 2006/0172853 A1* | 8/2006 | Ishibashi et al. | 477/52 |
| 2007/0000745 A1* | 1/2007 | Cameron et al. | 192/3.28 |
| 2007/0004603 A1* | 1/2007 | Iyer et al. | 508/441 |
| 2007/0042916 A1* | 2/2007 | Iyer et al. | 508/110 |
| 2010/0241304 A1* | 9/2010 | Maeda | 701/29 |

FOREIGN PATENT DOCUMENTS

| | | |
|---|---|---|
| FR | 2793857 A1 | 11/2000 |
| WO | 2007045986 A1 | 4/2007 |

OTHER PUBLICATIONS

Supplementary European Search Report for corresponding European App. EP 08 87 8970.

* cited by examiner

METHOD AND DEVICE FOR CONTROLLING DISENGAGEMENT OF AN AUTOMATED VEHICLE MASTER CLUTCH

BACKGROUND AND SUMMARY

The present invention generally relates to a method and device for controlling disengagement of an automated vehicle master clutch.

The present invention also relates to a computer program, computer program product and a storage medium for a computer all to be used with a computer for executing said method.

Heavy commercial vehicles such as overland trucks and buses are known to employ automatic mechanical transmissions (AMT) that are based on programmed routines. With an AMT, the gears are selected and shifted using specially designed routines. A transmission control unit can be arranged to control different couplings in a gearbox of said AMT in order to engage or disengage different gear ratios. At some or all gearshifts a master clutch, included in said AMT and, arranged between a propulsion unit and said gearbox disengages said gearbox from said propulsion unit during a gearshift. Said master clutch, if being of a lamella type, can also be used for synchronizing some or all of a rotational speed difference between a former engaged gear ratio and a selected next gear ratio to be engaged. Said propulsion unit drives wheels drivingly connected to an output drive shaft of said AMT. The propulsion unit, the AMT, drive shafts and the driven wheels form a drivetrain of said vehicle.

When said master clutch is engaged and said propulsion unit is driving said driven wheels with a certain positive torque the drive shafts of the drivetrain are twisted a certain amount like a torsion spring. Thus, there is a certain angular deformation dependent of said positive torque. If the master clutch would suddenly and abruptly be disengaged, the drive shafts would start to oscillate. Such an oscillation would make it difficult to quickly engage a subsequent gear ratio in the gearbox since the drive shafts and gear wheels in the gearbox would move relative each other. Said oscillations effect vehicle travel comfort negatively. This oscillation problem is especially problematic at low vehicle speeds and high gear ratios (low gear). Therefore a known solution in order to avoid such drivetrain oscillations in connection to a gear shift is to ramp down output torque produced by said propulsion unit according to a predefined torque decreasing algorithm. Thus, an output torque will be decreased with a certain speed'down to approximately zero torque in said drive train, before the master clutch can be disengaged. This known solution is working well but it takes some additional time to ramp down output torque produced by said propulsion unit in this controlled way. Said additional time can sometimes be critical in order to be able to perform a successful upshift during, for example, a heavy load vehicle condition when upshifting during climbing a relatively steep uphill.

A known way to decrease shifting time is disclosed in document U.S. Pat. No. 6,847,878. Here, the master clutch is abruptly disengaged and an oscillation is initiated. When the angular speed of a primary shaft due to the oscillation has decreased to relatively close to the angular speed that the primary shaft has to assume to carry out the engagement of a subsequent gear, said subsequent gear is engaged. This solution is very fast, oscillations are decreased, but transmission wear is increased, and thus durability can be affected negatively.

The present invention is concerned with the decreasing of gear shifting time, especially in order to achieve a faster upshift. The present invention is further concerned with increasing vehicle comfort and guaranteeing a long durability.

It is desirable to provide an improved method and device for disengaging a master clutch, which is fast, has satisfying vehicle comfort and where a long durability of the transmission is secured.

According to a first aspect of the invention, there is provided a method for controlling disengagement of an automated vehicle master clutch arranged in a vehicle drivetrain between a vehicle propulsion unit and a step geared transmission. Said method comprises (includes but not necessary limited to) the steps of:

- determining a first output torque of said propulsion unit prior to initiation of a master clutch disengagement procedure, and where said first output torque is positive or negative;
- computing a second output torque of said propulsion unit in dependence of at least said first output torque, and where said second output torque is closer to zero torque than said first output torque;
- initiating said master clutch disengagement procedure by initiating an oscillation in drive shafts of said drivetrain by abruptly altering output torque of said propulsion unit from said first output torque to said second output torque; and
- disengaging said master clutch when said oscillation has reached a first oscillation turning point.

According to one embodiment of an aspect of the invention said method further comprises that the amount of said second output torque in relation to said first output torque being such that angular deformation of the drive shafts and angular deformation speed in said drive shafts is approximately zero at said first oscillation turning-point.

According to a further embodiment of an aspect of the invention said method further comprises; computing said second output torque in dependence of said first output torque and inertia of said propulsion unit. According to a further developed embodiment of an aspect of the invention said method further comprises; computing said second output torque also additionally in dependence of vehicle travel resistance.

According to another embodiment of an aspect of the invention said method further comprises; computing said second output torque according to the following formula:

$$T1 = T0/2 - (leng * itot * g * \alpha)/(2 * rtyre),$$

where the different included parameters are explained below.

According to another aspect of the present invention, a vehicle drivetrain according to an aspect of the present invention comprises a propulsion unit drivingly connected to driven wheels through an automated vehicle master clutch, a transmission and drive shafts. At least one control unit is arranged for controlling engagement and disengagement of said vehicle master clutch and output torque of said propulsion unit. Said at least one control unit is arranged to perform the steps of one of the above mentioned inventive embodiments.

BRIEF DESCRIPTION OF THE DRAWINGS

The accompanying drawings variously illustrate aspects of the presently disclosed inventions. It should be appreciated that the illustrated embodiments are exemplary only, and do not serve as limitations to the protection. The drawings do, however, constitute part of the disclosure of the specification, and thereby contribute to, and provide support for the inventions. In the figures.

DETAILED DESCRIPTION

Figure 1:
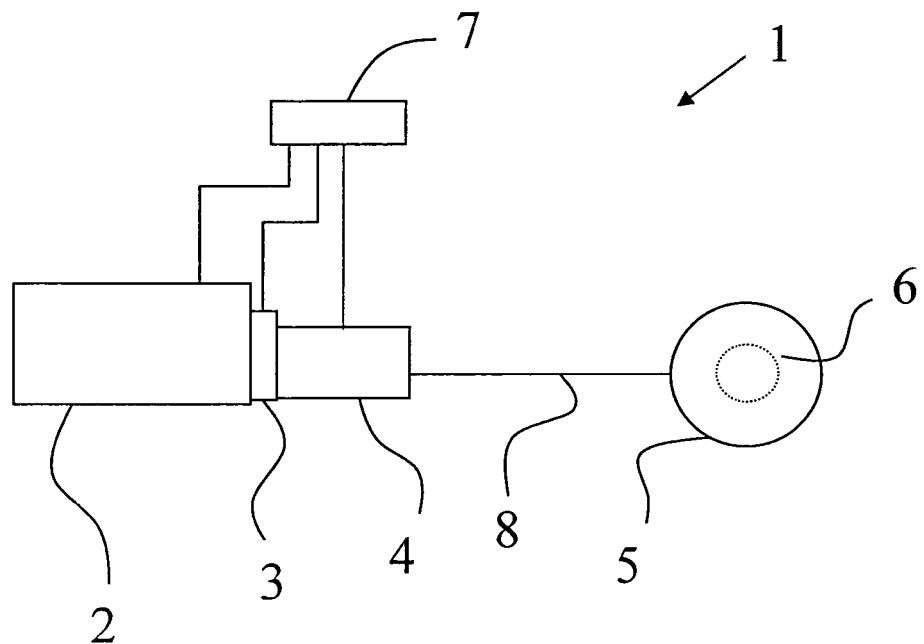
FIG. 1 discloses a schematic representation of a vehicle comprising a drivetrain according to one exemplary embodiment of the invention.

FIG. 1 schematically discloses a drive train 1 of a vehicle. A wheel 5 is driven by a propulsion unit 2 via a master clutch 3, a step geared transmission 4 and a propeller shaft 8 in a known way. The transmission can be a manual transmission or an automated manual transmission (AMT). Said propulsion unit can be a combustion engine or a combination of a combustion engine and an electric motor/generator, so called hybrid electric vehicle (HEV).

A control unit 7 is arranged to control the propulsion unit 2 and its torque output. Said control unit is further arranged to control the master clutch 3 and optionally the automated transmission 4 in accordance with different input signals such as rotational speed of said propulsion unit 2, rotational speed of input/output shaft of said transmission 4, selected gear in the transmission and driver input through, for example, an accelerator pedal in a known way. Said control unit 7 can in an alternative embodiment comprise of two or several control units connected for example through a network. Said controlling functions can be divided between said control units. Said master clutch can be a dry or wet disc clutch with one or several discs (lamellas).

Figure 2:
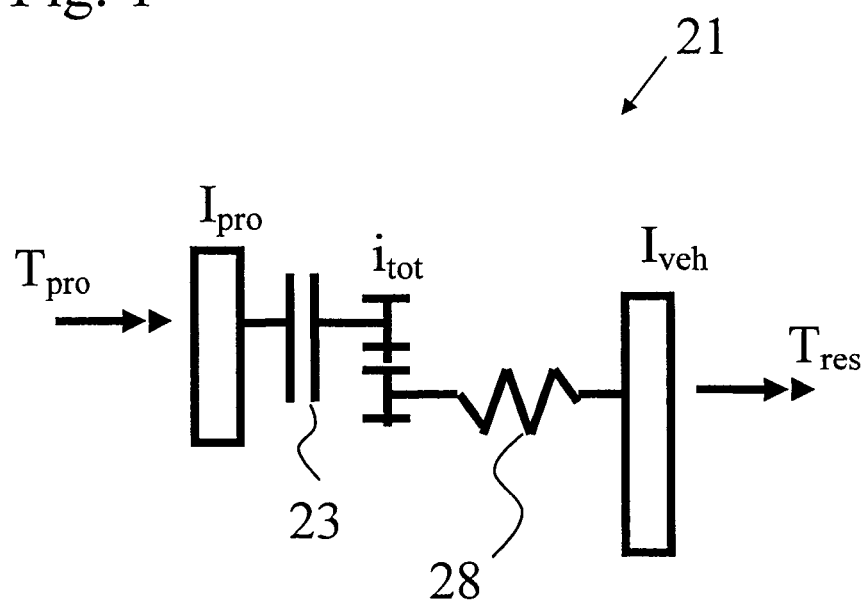
FIG. 2 discloses an even more schematic representation of the drivetrain disclosed in FIG. 1.

FIG. 2 discloses a drivetrain 21 that is an even more schematic view of the drivetrain 1 in FIG. 1. Tpro in FIG. 2 denotes the torque produced by said propulsion unit 2 on its' moment of inertia. The moment of inertia of the propulsion unit 2 is denoted Ipro. Said master clutch 3 is denoted 23 in FIG. 2. The torque is transmitted by said master clutch via a gear ratio itot in said transmission to drive shafts 28, which are twisted (angular deformation) like a torsion spring by said torque. In the other end of the drivetrain, the driven wheels 6, and consequently the drivetrain, are affected by the moment of inertia of the total vehicle mass Iveh due to translational vehicle movement. Iveh is a parameter included in travel resistance of the vehicle. Total vehicle travel resistance can be expressed as a torque, Tres. The inclination of the road (in formula below expressed α) has a great impact on the size of Tres.

Figure 3A:
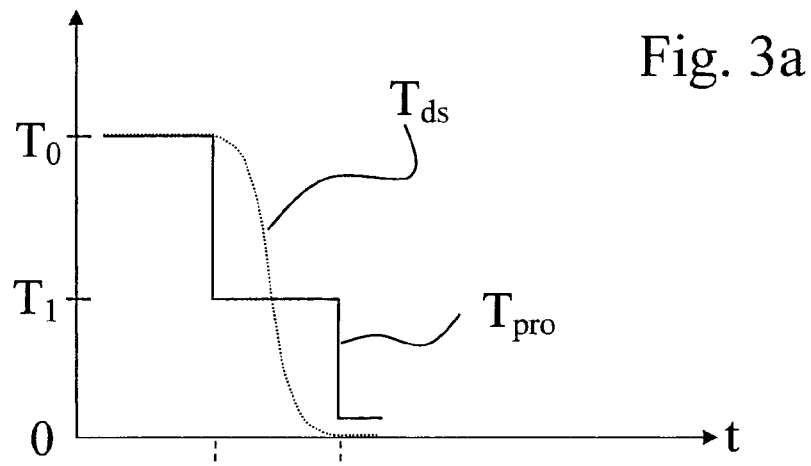
FIGS. 3a to 3c disclose diagrams illustrating how the propulsion unit torque and position of the master clutch is controlled according to the invention. Further disclosed is how rotational speed of the propulsion unit. varies during said master clutch disengagement.
Figure 3B:
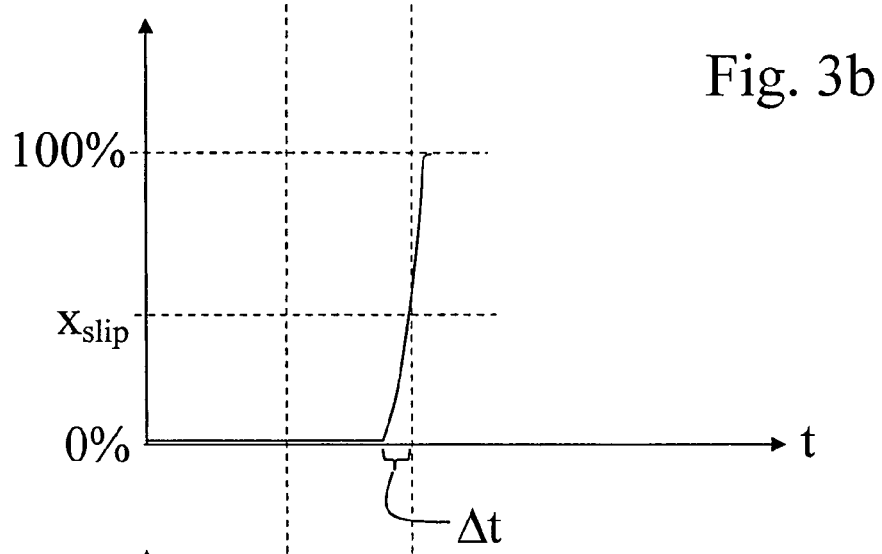
Figure 3C:
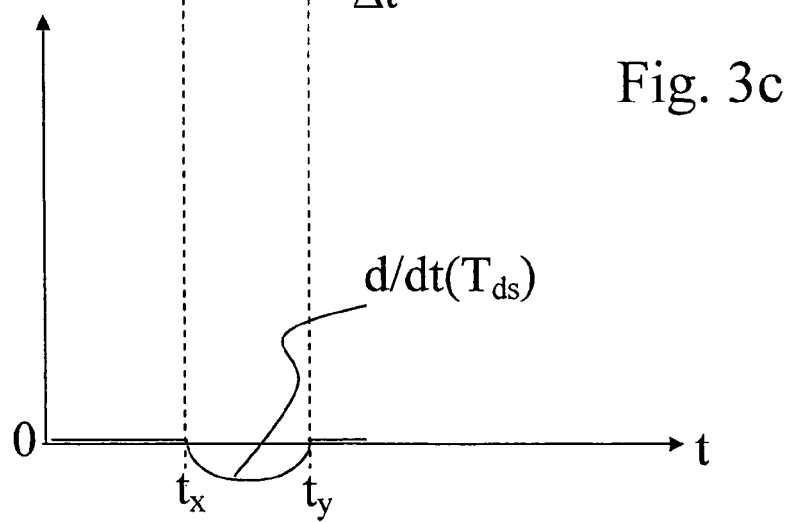

The invention will now be further explained through the FIGS. 3a to 3c. The dashed two vertical straight lines crossing the figures are help lines. The dashed two horizontal lines in FIG. 3b are also help lines. FIG. 3a discloses how the torque Tpr0 produced by said propulsion unit 2 is altered during a master clutch disengagement procedure. According to one embodiment of the invention, said control unit 7 is programmed to determine a first output torque T0 produced by said propulsion unit 2 when said master clutch is engaged. This first output torque is registered just before initiation of the master clutch disengagement procedure.

FIG. 3b discloses the engagement status of the master clutch. 0% means that the master clutch is fully engaged and 100% means that the master clutch is fully disengaged. Said first output torque T0 can be measured or estimated according to known methods which will not be further explained in this description. Said first output torque T0 can be positive or negative, which means that the propulsion unit 2 can drive or brake the vehicle. In an uphill slope the propulsion unit will produce a positive output torque in order to maintain vehicle speed or accelerate the vehicle. In a downhill slope the propulsion unit can be controlled in order to brake the vehicle or to maintain a vehicle speed. If said vehicle travels on a horizontal road said first output torque T0 can also be positive or negative, depending of if the vehicle is accelerated or retarded. FIG. 3a discloses positive torques, where the vehicle travels in a uphill slope. Negative torques before time point ty and where the vehicle travels in a down hill slope would in most cases be mirror inverted around the time axis. The torque levels after ty would be the same.

When said first output torque T0 has been determined the control unit is programmed to compute a second output torque T1. Said computation is performed in dependence of at least said first output torque T0. According to the invention said second output torque T1 is computed in such a way as to be closer to zero torque than said "first output torque T0. When said first and second output torques have been determined said control unit 7 is programmed to initiate said master clutch disengagement procedure at time point tx by initiating an oscillation in the drive shafts 8 (or 28) of said drivetrain 1 (or 21). Said oscillation is initiated by the control unit 7 controlling the propulsion unit 2 so that the output torque Tpro is abruptly altered from said first output torque T0 to said second output torque T1. As disclosed in FIG. 3a the curve indicates a very fast alteration from T0 to Ti. As soon as the output torque Tpro has been altered the drive shafts will start to oscillate "around" a new torque level, which in this case is Ti. The curve marked with Tds denotes the torque in the drive shafts and how this torque oscillates around the second output torque T1. The oscillation will have an amplitude for the first swing which approximately corresponds to the difference between T0 and Ti as disclosed in FIG. 3a, at least if the vehicle is not traveling in a very steep upslope or down slope (see formula below for further explanation). According to the invention said control unit is programmed to disengage said master clutch when said oscillation has reached a first oscillation turning point. This turning point will occur at time point ty. FIG. 3b indicates that the disengagement of the master clutch has started a short time, Δt, before ty. Δt is determined by a clutch position of the master clutch where the master clutch starts to slip, xslip−Δt is very short and the master clutch is disengaged to 100% as fast as possible at this time point ty in order not to transmit any torque after said turning point has occurred. The benefit of disengaging the master clutch at this turning point is that Tds is close to zero, which also means that angular deformation and angular–deformation speed, d/dt(Tds), of the drive shafts are zero or close to zero.

FIG. 3c discloses how the angular deformation speed, d/dt (Tds), varies in the drive shafts after the abrupt altering of the output torque Tpro at time point tx. At first d/dt (Tds) decreases and reaches a bottom speed when the torque in the drive shafts equals Ti. Then, d/dt(Tds) increases and reaches zero again at the first oscillation turning point (time point ty). Before time point tx and after time point ty the d/dt(Tds) is zero. According to one embodiment of the invention said control unit can be programmed to compute said second output torque T1 in relation to said first output torque T0 such that the angular deformation of the drive shafts and the angular deformation speed in said drive shafts is approximately zero at said oscillation turning point. The closer Tds and d/dt (Tds) are to zero when the master clutch is disengaged the better the oscillation can be terminated.

When the master clutch is disengaged under such a driveline condition said oscillation is "killed", since the drive shafts at time point ty have oscillated to a position where Tds is zero. Disengaging said master clutch according to this inventive procedure gives a shorter time from initiation of the master clutch disengagement procedure to a disengaged driveline, compared to prior art where predefined torque ramps are used in order to not create oscillations. Thus, overall gear shifting time can be shortened with maintained durability. Further, better comfort and easier gear shifting is achieved with the inventive procedure.

The output torque Tpro produced by the propulsion unit is at time point ty altered once more, in the disclosed case, down to a torque level which, for example, is enough to maintain idle speed if said propulsion unit is a combustion engine. If said propulsion unit is an electric motor the torque can be altered to zero or to a torque where a certain rotational speed can be maintained. This second torque alteration is necessary in order to avoid racing rotational speed of the propulsion unit, due to the propulsion unit being disengaged from the transmission and the drive shafts.

According to a further embodiment of the invention said control unit is programmed to compute said second output torque T1 in dependence of said first output torque T0 and inertia Ipro of said propulsion unit. According to a further developed embodiment of the invention said control unit is programmed to compute said second output torque T1 also additionally in dependence of vehicle travel resistance, which can comprise for example road inclination a, rolling resistance and air resistance. The road inclination is usually the parameter that affects the total vehicle travel resistance most. So, the simplest way to express vehicle travel resistance can be to only use the road inclination.

According to another embodiment of the invention a predefined formula can be used in order to compute said second output torque T1:

$$T1 = T0/2 - (Ipro * itot * g * \alpha)/(2 * rtyre), \text{ where;}$$

T0=Engine torque on its' inertia before step [Nm]
T1=Engine torque on its' inertia after step [Nm]
Ipro=Engine inertia [kgm2]
itot=Total ratio [1]
g=Constant of gravity [m/s2]
α=Vehicle resistance expressed as road inclination [m]
rtyre=Tyre radius of driven wheel [1]

As can be seen only road inclination is used for expressing vehicle travel resistance in the disclosed formula. In other embodiments a in said formula can be changed to comprise also other parameters that affect vehicle travel resistance such as, for example, mentioned rolling resistance and air resistance. As can be seen in the disclosed formula, if the vehicle is traveling in an uphill slope α will be positive and consequently Ti will be smaller than half of To if the torques are positive torques, which they usually should be. If the vehicle travels in a down hill slope and the torques and α are negative Ti will consequently still be smaller than half of T0, but on the minus side of the torque axis (mirror inverted).

It should be noted that the abrupt alternation from T0 to Ti is independent of stiffness and natural frequency of the drivetrain.

Said inventive master clutch disengaging procedure can according to one embodiment be executed in connection to every time the clutch needs to be disengaged, for example especially in connection to upshifts where every possibility to decrease shifting time can sometimes be critical. Said inventive master clutch disengaging procedure can also be used for downshifts or upshifts in a downhill slope, or downshifts in an uphill slope, or for gear shifting on horizontal roads. Said inventive master clutch disengaging procedure can also be used in situations where the master clutch has to be disengaged but no gearshift is performed. In a further embodiment of the invention said transmission control unit 7 can be programmed to execute said inventive master clutch disengaging procedure only when a heavy load vehicle condition is present, for example during an upshifting during climbing a relatively steep uphill under heavy load.

Figure 4:
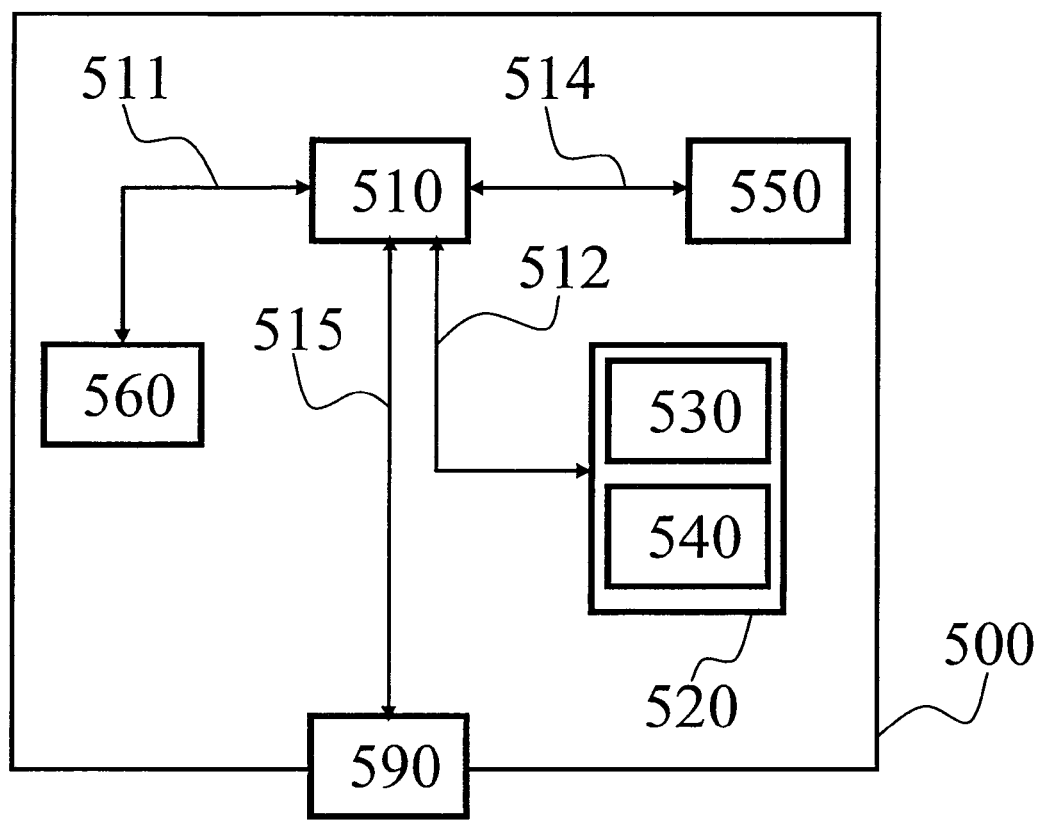
FIG. 4 discloses an embodiment of the invention applied in a computer environment.

FIG. 4 shows an apparatus 500 according to one aspect of the invention, comprising a non-volatile memory 520, a processor 510 and a read and write memory 560. The memory 520 has a first memory portion 530 in which a computer program for controlling the apparatus 500 is stored. The computer program in the memory portion 530 for controlling the apparatus 500 can be an operating system. The apparatus 500 can be enclosed for example in a control unit, such as the transmission control unit 7. The data processing unit 510 can comprise a microcomputer.

The memory 520 also has a second memory portion 540 in which there is stored a program for controlling said master clutch. In an alternative embodiment the program for controlling said master clutch is stored in a separate non-volatile computer storage medium 550, such as a flash memory device. The program can be stored in executable form or in a compressed state.

Since in the following it is described that the data processing unit 510 performs a special function, it should be clear that the data processing unit 510 runs a special part of the program which is stored in the non-volatile recording medium 550.

The data processing unit 510 is adapted for communication with the memory 550 by means of a data bus 514. The data processing unit 510 is also adapted for communication with the memory 520 via a data bus 512. Furthermore, the data processing unit 510 is adapted for communication with the memory 560 by means of a data bus 511. The data processing unit 510 is also adapted for communication with a data port 590 via a data bus 515.

The methods described above can be performed by the data processing unit 510 running the program which is stored in memory 540 or the program which is stored in the non-volatile recording medium 550.

The invention claimed is:

1. A method for controlling disengagement of an automated vehicle master clutch arranged in a vehicle drivetrain between a vehicle propulsion unit and a step geared transmission, the method comprising the steps of:
   determining a first output torque of the propulsion unit prior to initiation of a master clutch disengagement procedure, and where the first output torque is positive or negative;
   computing, via a control unit, a second output torque of the propulsion unit in dependence of at least the first output torque, and where the second output torque is closer to zero torque than the first output torque;
   initiating the master clutch disengagement procedure by initiating an oscillation in drive shafts of the drivetrain by abruptly altering output torque of the propulsion unit from the first output torque to the second output torque; and disengaging the master clutch when the oscillation has reached a first oscillation turning point.

2. The method as recited in claim 1, wherein the amount of the second output torque in relation to the first output torque is such that angular deformation of the drive shafts and angular deformation speed in the drive shafts is approximately zero at the first oscillation turning point.

3. The method as recited in claim further comprising:
computing the second output torque in dependence of the first output torque and inertia of the propulsion unit.

4. The method as recited in claim 1, further comprising:
computing: the second output torque also in dependence of vehicle travel resistance.

5. The method as recited in claim 1, further comprising computing the second output torque according to the following formula:

$$T1=T0/2-(leng*itot*g*\alpha)/(2*rtyre), \text{ where;}$$

T0=Engine torque on its' inertia before step [Nm]
T1=Engine torque on its' inertia after step [Nm]
Ipro=Engine inertia [kgm2]
itot=Total ratio [1]
g=Constant of gravity [m/s2]
α=Vehicle resistance expressed as road inclination [m]
rtyre=Tyre radius of driven wheel [1].

6. A vehicle drivetrain comprising
a propulsion unit drivingly connected to driven wheels through an automated vehicle master clutch,
a transmission and drive shafts, and
at least one control unit arranged for controlling engagement and disengagement of the vehicle master clutch and output torque of the propulsion unit, wherein the at least one control unit is arranged to perform a method for control hug disengagement of an automated vehicle master clutch arranged in a vehicle drivetrain between a vehicle propulsion unit and a step geared transmission, the method comprising the steps of:
determining a first output torque of the propulsion unit prior to initiation of a master clutch disengagement procedure, and where the first output torque is positive or negative;
computing a second output torque of the propulsion unit in dependence of at least the first output torque, and where the second output torque is closer to zero torque than the first output torque;
initiating the master clutch disengagement procedure by initiating an oscillation in drive shafts of the drivetrain by abruptly altering output torque of the propulsion unit from the first output torque to the second output torque; and
disengaging the master clutch when the oscillation has reached a first oscillation turning point.

7. A computer programmed with program code for performing a method for controlling disengagement of an automated vehicle master clutch arranged in a vehicle drivetrain between a vehicle propulsion unit and a step geared transmission, the method comprising the steps of:
determining a first output torque of the propulsion unit prior to initiation of a master clutch disengagement procedure, and were the first output torque is positive or negative;
computing a second output torque of the propulsion unit in dependence of at least the first output torque, and where the second output torque is closer to zero torque than the first output torque;
initiating the master clutch disengagement procedure by initiating an oscillation in drive shafts of the drivetrain by abruptly altering output torque of the propulsion unit from the first output torque to the second output torque; and
disengaging the master clutch when the oscillation has reached a first oscillation turning point.

8. A non-transitory storage medium for use in a computing environment the comprising a computer readable program code to perform a method for controlling disengagement of an automated vehicle master clutch arranged in a vehicle drivetrain between a vehicle propulsion unit and a step geared transmission, the method comprising the steps of:
determining a first output torque of the propulsion unit prior to initiation of a master clutch disengagement procedure, and where the first output torque is positive or negative;
computing a second output torque of the propulsion unit in dependence of at least the first output torque, and where the second output torque is closer to zero torque than the first output torque;
initiating the master clutch disengagement procedure by initiating an oscillation in drive shafts of the drivetrain by abruptly altering output torque of the propulsion unit from the first output torque to the second output torque; and
disengaging the master clutch when the oscillation has reached a first oscillation turning point.

* * * * *